United States Patent
Zhou et al.

(10) Patent No.: US 9,998,214 B2
(45) Date of Patent: Jun. 12, 2018

(54) OPTICAL TIME DOMAIN REFLECTOMETER IMPLEMENTATION APPARATUS AND SYSTEM

(71) Applicant: Huawei Technologies Co., Ltd., Shenzhen (CN)

(72) Inventors: Xiaoping Zhou, Shenzhen (CN); Jinrong Yin, Shenzhen (CN); Cong Chen, Shenzhen (CN)

(73) Assignee: Huawei Technologies Co., Ltd, Shenzhen (CN)

( * ) Notice: Subject to any disclaimer, the term of this patent is extended or adjusted under 35 U.S.C. 154(b) by 0 days. days.

(21) Appl. No.: 15/289,398

(22) Filed: Oct. 10, 2016

(65) Prior Publication Data

US 2017/0033863 A1 Feb. 2, 2017

Related U.S. Application Data

(63) Continuation of application No. PCT/CN2014/075026, filed on Apr. 10, 2014.

(51) Int. Cl.
*H04B 10/071* (2013.01)
*H04J 14/02* (2006.01)
(Continued)

(52) U.S. Cl.
CPC ........ *H04B 10/071* (2013.01); *H04J 14/0282* (2013.01); *H04B 10/70* (2013.01); *H04B 10/80* (2013.01)

(58) Field of Classification Search
None
See application file for complete search history.

(56) References Cited

U.S. PATENT DOCUMENTS

| 6,549,018 B1 | 4/2003 | Bleck et al. |
| 2006/0110161 A1 | 5/2006 | Cho et al. |

(Continued)

FOREIGN PATENT DOCUMENTS

| CN | 202488458 U | 10/2012 |
| CN | 102821330 A | 12/2012 |

(Continued)

OTHER PUBLICATIONS

Hann, S., et al., "Monitoring technique for a hybrid PS/WDM-PON by using a tunable OTDR and FBGs," Institute of Physics Publishing, Meas. Sci. Technol. 17, Apr. 7, 2006, pp. 1070-1074.

*Primary Examiner* — Darren E Wolf
(74) *Attorney, Agent, or Firm* — Slater Matsil, LLP

(57) ABSTRACT

Embodiments disclose an OTDR implementation apparatus. The apparatus includes M transmitters, configured to transmit M optical waves of different wavelengths, where M is greater than or equal to 2. The apparatus also includes a processor, configured to control an OTDR detection circuit to load an OTDR detection signal onto a first transmitter, where the first transmitter is configured to only load the OTDR detection signal, and the other M−1 transmitters are configured to transmit a downlink optical signal, where the downlink optical signal is a high frequency signal. The apparatus also includes the OTDR detection circuit, configured to generate the OTDR detection signal, where the OTDR detection signal is a low frequency signal; and M receivers, where a first receiver is connected to an egress link of the M transmitters, and the other M−1 receivers are connected after a demultiplexer, and are configured to receive multiple uplink signals.

12 Claims, 10 Drawing Sheets

(51) Int. Cl.
*H04B 10/70* (2013.01)
*H04B 10/80* (2013.01)

(56) References Cited

U.S. PATENT DOCUMENTS

2008/0002971 A1 1/2008 Genay et al.
2010/0098422 A1 4/2010 Takeda

FOREIGN PATENT DOCUMENTS

| CN | 102957977 A | 3/2013 |
| CN | 103166700 A | 6/2013 |
| EP | 2337240 A1 | 6/2011 |
| WO | 2004107627 A1 | 12/2004 |
| WO | 2010043056 A1 | 4/2010 |

US 9,998,214 B2

OPTICAL TIME DOMAIN REFLECTOMETER IMPLEMENTATION APPARATUS AND SYSTEM

CROSS-REFERENCE TO RELATED APPLICATIONS

This application is a continuation of International Patent Application No. PCT/CN2014/075026, filed on Apr. 10, 2014, the disclosure of which is hereby incorporated by reference in its entirety.

TECHNICAL FIELD

The present invention relates to the communications field, and in particular, to an optical time domain reflectometer implementation apparatus and system.

BACKGROUND

FIG. 1 is a schematic structural diagram of a passive optical network (PON) system 100. As shown in FIG. 1, the system 100 includes the following three parts: an optical line terminal (OLT) 102, an optical distribution network (ODN) 104, and an optical network unit (ONU) 106. In the PON system 100, transmission from the OLT 102 to the ONU/ONT 106 is referred to as downlink, and transmission from the ONU/ONT 106 to the OLT 102 is referred to as uplink. Downlink data is broadcast by the OLT 102 to each ONU 106 because of a characteristic of light. A transmit timeslot is allocated by the OLT 102 for sending uplink data of each ONU 106. Time division multiplexing transmission is used in an uplink direction. The ODN 104 is an optical distribution network, which transmits downlink data of the OLT 102 to each ONU 106 and collects and transmits uplink data of multiple ONUs 106 to the OLT 102. The ONU 106 provides a user-side interface to the PON system 100, and is connected to the ODN 104 in uplink. The ODN 104 is generally divided into three parts: a passive optical splitter (Splitter) 108, a feeder fiber 110, and a distribution fiber 112. For a general PON system 100, different wavelengths are used in downlink and uplink. A direction from an OLT 102 to an ONU 106 is referred to as a downlink direction, and a center wavelength of 1490 nm is used in a G/EPON (Gigabit passive optical network/Ethernet passive optical network). A direction from the ONU 106 to the OLT 102 is referred to as an uplink direction, and a center wavelength of 1310 nm is used in the G/EPON.

A PON 100 is of a tree structure, and there are multiple ONUs 106 connected to an OLT 102 of one central office. Therefore, how to maintain network stability and how to determine fault liability become current focuses of attention.

Currently, a common means in the industry is performing fault detection and locating in an optical network by using an optical time domain reflectometer (OTDR). The basic principle of the optical time domain reflectometer is that light of a wavelength is incident into a fiber network by means of backward reflection generated when an optical wave is propagated in the fiber network, and then, an optical network status is reflected by measuring energy of corresponding reflected light, which, for example, is described by using the prior art 1 in FIG. 2 as an example. Downlink light is of 1490 nm, uplink light is of 1310 nm, and the light of 1310 nm can penetrate through a TFF filter 202, enter a channel b, and be detected by a photo detector (PD). The downlink light of 1490 nm carries an OTDR detection signal, enters a PON from a channel a after being reflected by a thin film filter (TFF), after a reflected optical signal of the PON returns to the channel a, enters a channel d after being reflected by the TFF filter, and is detected by the PD of 1490 nm. A speed of light in a fiber can be estimated, and a curve of reflected light intensity that changes over time corresponds to a curve of the reflected light intensity that changes with distance. Therefore, a particular fault that occurs at a particular distance can be determined according to a change of the reflected light intensity. For example, that a large amount of reflected light energy is detected means that a problem of fiber cut may occur at a particular distance. If energy decrement is detected, it means that a problem of fiber bending may occur, and further fault rectification is performed.

For a TWDM-PON (Time Wavelength Division Multiplexing Passive Optical Network) as a next generation PON technology, there is no solution for how to determine a fiber fault by using an OTDR.

SUMMARY

Embodiments of the present invention provide an optical time domain reflectometer (OTDR) implementation apparatus and system, so as to resolve a problem of how to detect a fiber fault by using an OTDR in a TWDM-PON and further perform fault rectification.

To achieve the foregoing objective, the following technical solutions are used in the embodiments.

According to a first aspect, an optical time domain reflectometer (OTDR) implementation apparatus includes multiple transmitters, configured to transmit multiple optical waves of different wavelengths. The apparatus also includes an OTDR detection circuit, configured to generate an OTDR detection signal. The apparatus also includes a processor, configured to select at least two random optical waves to load OTDR detection signals, where the OTDR detection signal is a low frequency signal. The apparatus also includes multiple receivers, where a first receiver is connected to an egress link of the multiple transmitters, and is configured to: receive reflected signals of the at least two optical waves carrying the OTDR detection signals, and transmit the reflected information to the OTDR detection circuit for detection, and other receivers are connected to a demultiplexer, and each are configured to receive multiple uplink signals.

According to a second aspect, an OTDR implementation apparatus includes: M transmitters, configured to transmit M optical waves of different wavelengths, where M is greater than or equal to 2. The apparatus also includes a processor, configured to: load a first downlink optical signal onto a second optical wave, and adjust a receive wavelength of a first optical network unit (ONU), to convert a first wavelength to a second wavelength, where the first ONU corresponds to a first optical wave. The apparatus also includes an OTDR detection circuit, configured to load an OTDR detection signal onto the first optical wave, where the OTDR detection signal is a low frequency signal. The apparatus also includes M+1 receivers, where a first receiver is connected to an egress link of the M transmitters, and is configured to receive a reflected signal of an optical wave carrying an OTDR detection signal, and the other M receivers are connected after a demultiplexer, and each are configured to receive multiple uplink signals.

According to a third aspect, an OTDR implementation apparatus includes M transmitters, configured to transmit M optical waves of different wavelengths, where M is greater than or equal to 2. The apparatus also includes a processor, configured to control an OTDR detection circuit to load an OTDR detection signal onto a first transmitter, where the first transmitter is configured to only load the OTDR detection signal, and the other M−1 transmitters are configured to transmit a downlink optical signal, where the downlink optical signal is a high frequency signal. The apparatus also includes the OTDR detection circuit, configured to generate the OTDR detection signal, where the OTDR detection signal is a low frequency signal. The apparatus also includes M receivers, where a first receiver is connected to an egress link of the M transmitters, and the other M−1 receivers are connected after a demultiplexer, and are configured to receive multiple uplink signals.

According to a fourth aspect, a passive optical network (PON) includes an optical line terminal (OLT) and an optical network unit (ONU), where the OLT is connected to the ONU by using an optical distribution network (ODN), and the OLT includes the apparatus according to the first aspect, includes the apparatus according to the second aspect, or includes the apparatus according to the third aspect.

By means of the foregoing technical solutions, when a TWDM-PON has a fault, information about a fault of an entire ODN can be obtained from an optical signal received by an OTDR.

BRIEF DESCRIPTION OF THE DRAWINGS

To describe the technical solutions in the embodiments of the present invention or in the prior art more clearly, the following briefly describes the accompanying drawings required for describing the embodiments. Apparently, the accompanying drawings in the following description show merely some embodiments of the present invention, and a person of ordinary skill in the art may still derive other drawings from these accompanying drawings without creative efforts.

DETAILED DESCRIPTION OF ILLUSTRATIVE EMBODIMENTS

The following clearly describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

Figure 1:
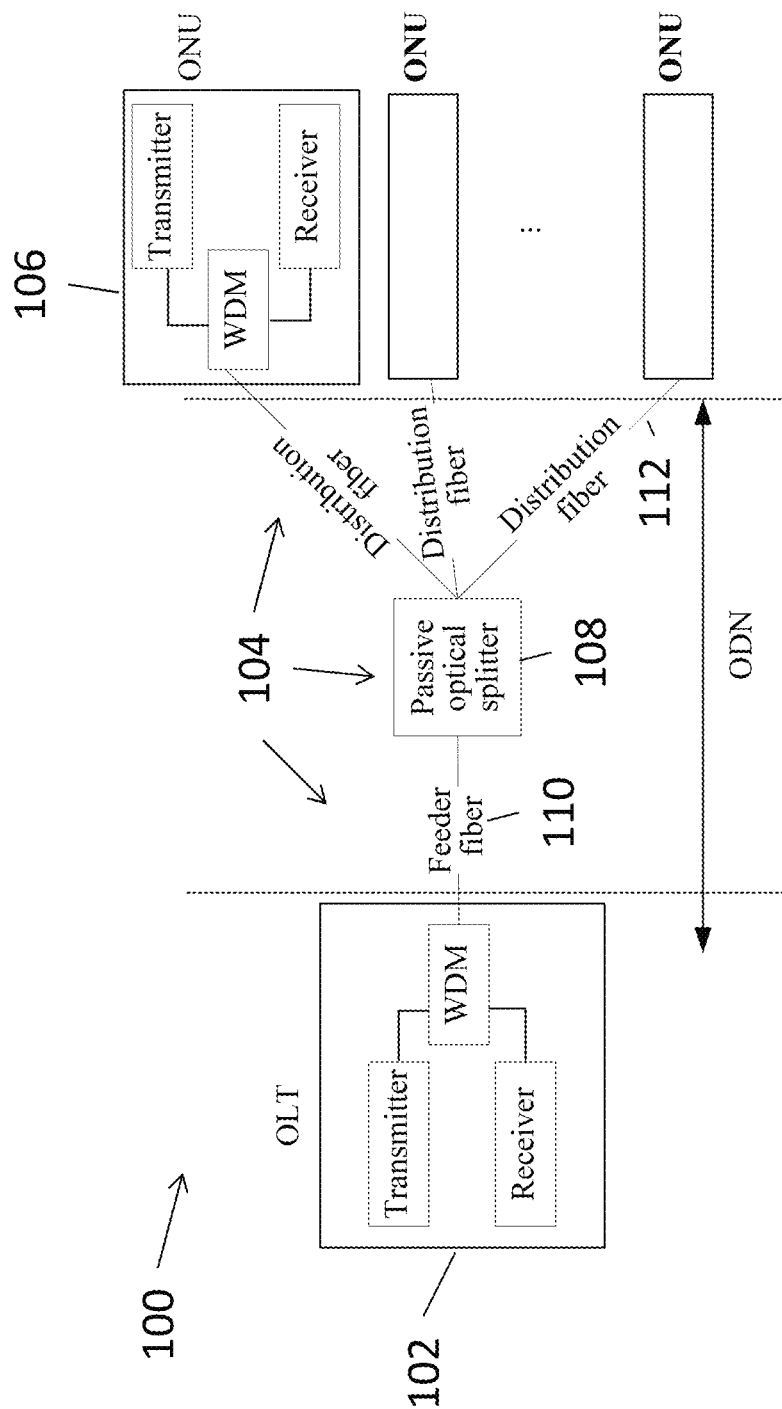
FIG. 1 is a schematic structural diagram of a PON system.
Figure 2:
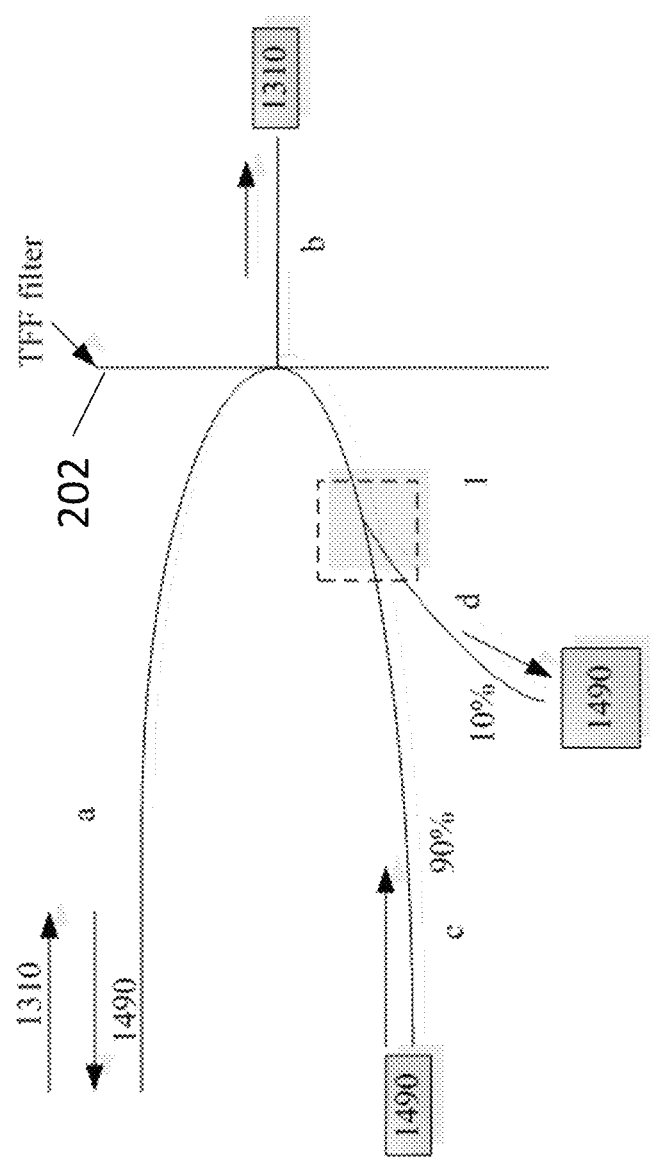
FIG. 2 is a schematic diagram of implementation of a function of an embedded optical time domain reflectometer (EOTDR)
Figure 3:
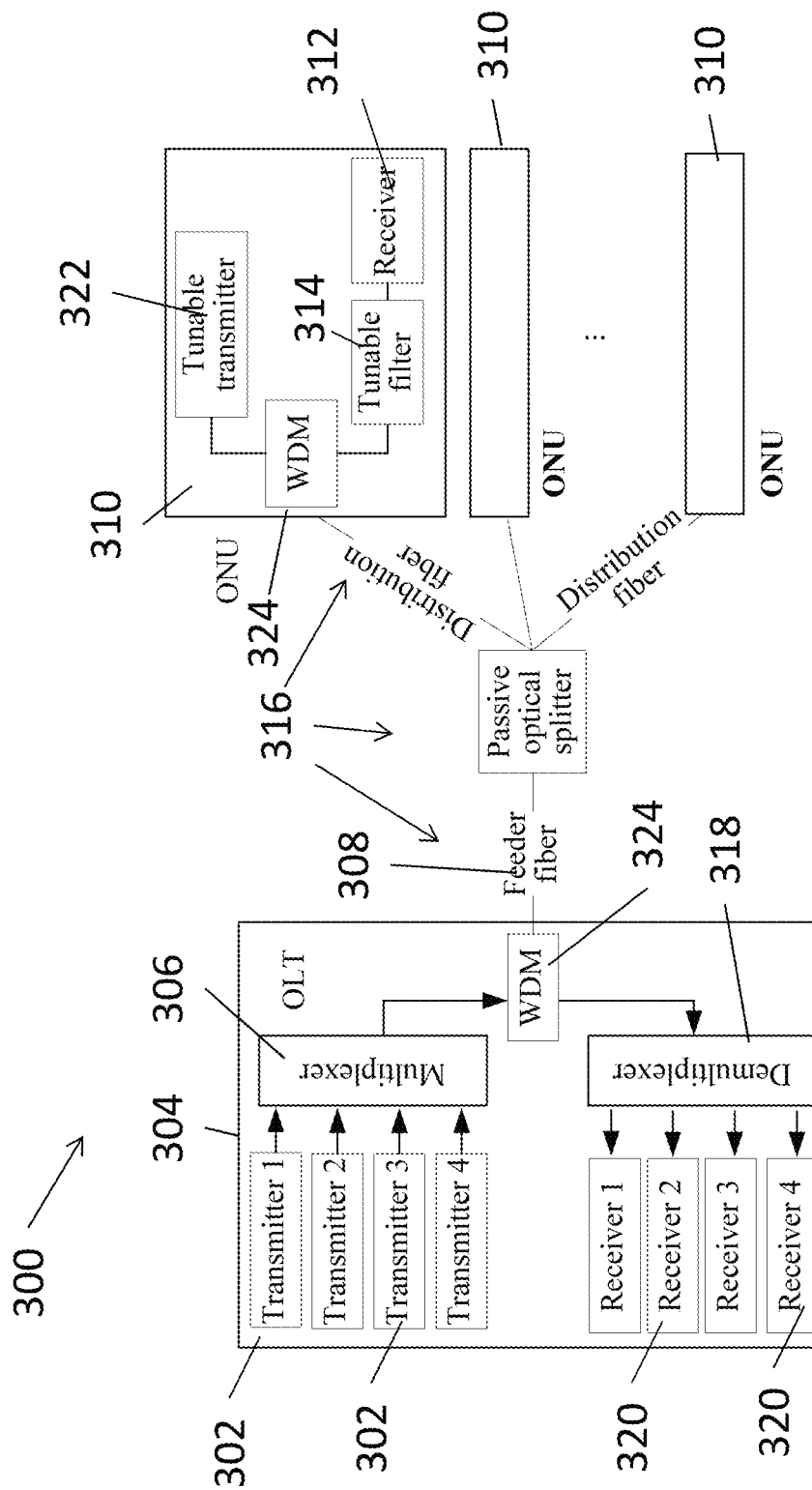
FIG. 3 is a structural diagram of a TWDM-PON system according to an embodiment.

As a next generation PON technology, a TWDM-PON is the inheritance and development of a PON architecture. The same as a PON, an entire ODN structure remains unchanged, and a difference is that a quantity of uplink and downlink wavelengths is increased to four or more. Specific details are shown in FIG. 3. FIG. 3 is a structural diagram of a TWDM-PON system 300 according to an embodiment of the present invention. Using four wavelengths as an example, in a downlink direction, four transmitters 302 at an OLT 304 end respectively transmit four optical waves of different wavelengths. The four wavelengths pass through a multiplexer 306, enter a feeder fiber 308, and then arrive at an ONU 310. A receiver 112 of the ONU 310 selects and receives only one wavelength. Therefore, a filter 314 needs to be added before the receiver 312. One of the four wavelengths needs to be selected; therefore, for a different ONU 310, four types of different filters 314 may be prepared; or a tunable filter 314 may be selected, and different wavelengths are configured according to actual needs, thereby reducing types of filters 314. In an uplink direction, any ONU 310 also transmits one of the four uplink wavelengths. Therefore, there are four types of uplink light in an ODN 316 at any moment. Same as the filter 314, a transmitter 322 of the ONU 310 may select four types of different lasers, or may use one type of tunable laser; and a particular wavelength is adjusted to according to needs, thereby reducing types of ONUs 310. After entering an optical distribution network 316 uplink, the four uplink wavelengths arrive at a demultiplexer 318 of an OLT 304. Uplink light of the four different wavelengths is separated by the demultiplexer 318, and enters different receivers 320. A wavelength division multiplexer (WDM) 324 in the OLT 304 and the ONU 310 is a filter configured to aggregate or separate the uplink and the downlink wavelengths.

Figure 4:
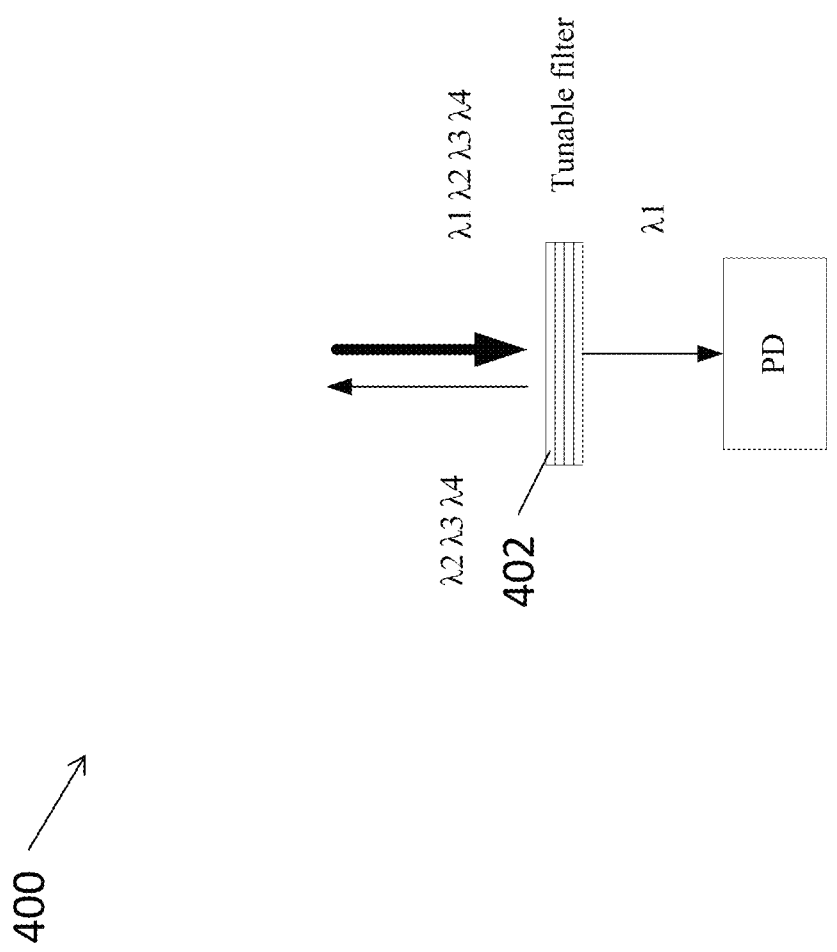
FIG. 4 is a schematic diagram of a function of an ONU of a TWDM-PON according to an embodiment.

FIG. 4 is a schematic diagram of a function of an ONU of a TWDM-PON 400 according to an embodiment of the present invention. Multiple wavelengths from an OLT pass through a fiber and an optical splitter, and all arrive at a front end of the ONU. However, each ONU selects only one optical wave of a wavelength of four downlink wavelengths, where information corresponding to the ONU is carried on the optical wave. Therefore, before an optical signal is received, a tunable filter 402 is required, to filter out one wavelength of the four wavelengths, and the other three wavelengths are all reflected or scattered. In a case in which OTDR protection is not considered, the foregoing three paths of light is wasted, but the three paths of light may be used to detect a fault situation of a network, as long as an angle of the tunable filter 402 is properly controlled, to enable three reflected optical waves to return to the fiber and eventually return to the OLT. In the following embodiments, these returned signals are processed, thereby detecting information about a fault of an entire ODN.

Figure 5:
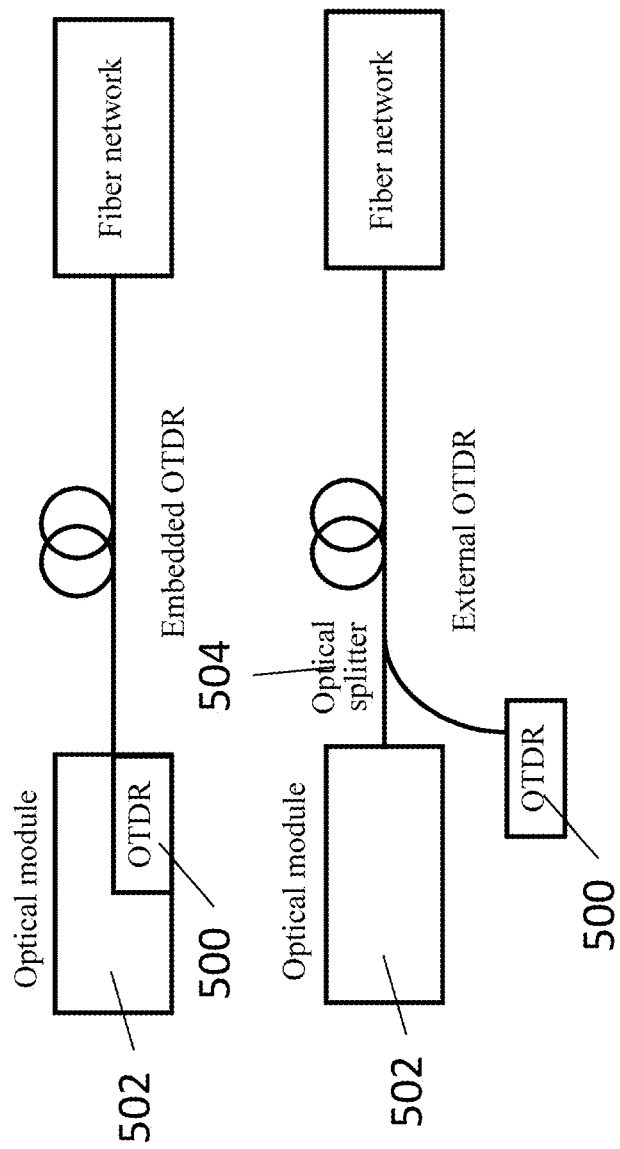
FIG. 5 is a schematic diagram of testing manners of embedded and external OTDRs.

It should be noted that OTDR apparatuses are classified into an external OTDR and an embedded OTDR, as shown in FIG. 5. The external OTDR refers to that a large and independent OTDR device 500 accesses an optical network by using an optical splitter 504, to perform measurement and monitoring, and OTDR transmitting and receiving functions are all implemented outside an optical module 502. The embedded OTDR refers to that OTDR transmitting and receiving functions are integrated in an optical module 502, to implement miniaturization and integration. The embedded OTDR is also referred to as an embedded optical time domain reflectometer (Embedded OTDR). The EOTDR generally reuses an LD (Laser Diode) or a PD (Photo Detector) of the OLT. Compared with the external OTDR, costs are lower, and integration degree is high; therefore, the embedded OTDR becomes a focus of attention.

The following embodiments may be applied to the embedded OTDR, or may be applied to the external OTDR. The following further described the present invention with reference to specific embodiments.

Embodiment 1

This embodiment provides an OTDR implementation apparatus. The apparatus includes multiple transmitters, configured to transmit multiple optical waves of different wavelengths. The apparatus also includes an OTDR detection circuit, configured to generate an OTDR detection signal. The apparatus also includes a processor, configured to select at least two optical waves to load OTDR detection signals, where the OTDR detection signal is a low frequency signal. The apparatus also includes multiple receivers, where a first receiver is connected to an egress link of the multiple transmitters, and is configured to receive reflected signals of the at least two optical waves carrying the OTDR detection signals, and other receivers are connected after a demultiplexer (Demux), and each are configured to receive multiple normal uplink signals, where a downlink optical signal is loaded onto each of optical waves transmitted by the multiple transmitters, and the downlink optical signal is a high frequency signal.

Optionally, the processor being configured to select at least two optical waves to load OTDR detection signals specifically includes: loading an OTDR detection signal of a first frequency onto a first optical wave of the at least two optical waves; and loading an OTDR detection signal of a second frequency onto a second optical wave of the at least two optical waves, where the first frequency is different from the second frequency.

Optionally, the processor being configured to select at least two optical waves to load OTDR detection signals includes: loading an OTDR detection signal onto a first optical wave of the at least two optical waves at a first time; and loading an OTDR detection signal onto a second optical wave of the at least two optical waves at a second time, where the first time is different from the second time.

Optionally, the OTDR implementation apparatus further includes an optical filter, connected before the first receiver, and configured to receive the reflected signals of the at least two optical waves, transmit the reflected signals to the first receiver, and filter out reflected signals of other multiple optical waves.

Optionally, after the first receiver receives a reflected signal of the loaded OTDR detection signal, the first receiver transmits the reflected signal to the processor for further processing.

Optionally, the optical filter is a tunable filter.

Optionally, the OTDR implementation apparatus further includes an electrical filter, connected before the optical filter, and configured to distinguish the OTDR detection signal of the first frequency from the OTDR detection signal of the second frequency.

Correspondingly, this embodiment further provides an OTDR implementation method, including: loading an OTDR detection signals onto at least two optical waves in multiple downlink optical waves, where the OTDR detection signal is a low frequency signal; and receiving reflected signals of the at least two optical waves.

Optionally, the loading OTDR detection signals onto at least two optical waves in multiple downlink optical waves specifically includes: loading an OTDR detection signal of a first frequency onto a first optical wave of the at least two optical waves; and loading an OTDR detection signal of a second frequency onto a second optical wave of the at least two optical waves.

Optionally, the loading OTDR detection signals onto at least two optical waves in multiple downlink optical waves specifically includes: loading an OTDR detection signal onto a first optical wave of the at least two optical waves at a first time, and sending the first optical wave; and loading an OTDR detection signal onto a second optical wave of the at least two optical waves at a second time, and sending the second optical wave.

Optionally, the receiving reflected signals of the at least two optical waves includes: receiving a reflected signal of the first optical wave; receiving a reflected signal of the second optical wave; and filtering out other reflected signals.

Optionally, the method further includes: separating the reflected signal of the first optical wave and the reflected signal of the second optical wave into two paths, and separately performing processing.

This embodiment is further described below with reference to a specific application scenario.

Figure 6:
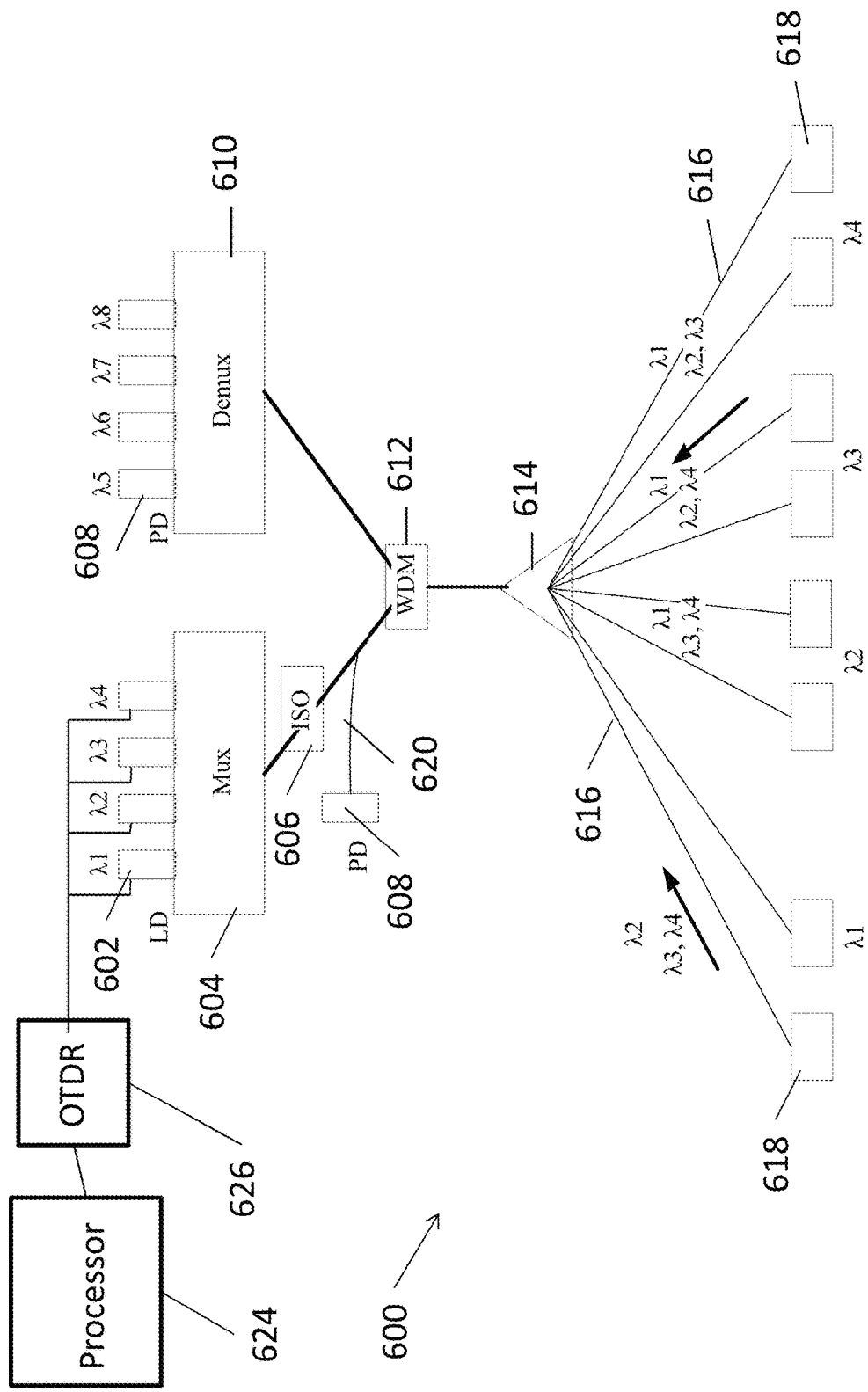
FIG. 6 is a schematic diagram of performing OTDR detection in a TWDM-PON according to an embodiment.

FIG. 6 is a schematic diagram of performing OTDR detection in a TWDM-PON 600 according to Embodiment 1 of the present invention. As shown in FIG. 6, light of four wavelengths $\lambda_1$, $\lambda_2$, $\lambda_3$, and $\lambda_4$ transmitted by a transmit end LD 602 of an OLT is combined into one path by using a Mux 604 (also referred to as a multiplexer), and enters a same fiber after passing through an ISO (isolator) 606. In addition, a receive end of the OLT receives four wavelengths $\lambda_5$, $\lambda_6$, $\lambda_7$, and $\lambda_8$ in total that are sent by all ONUs. The four wavelengths $\lambda_5$, $\lambda_6$, $\lambda_7$, and $\lambda_8$ respectively enter four different PD receivers 608 after being split by a Demux 610 (demultiplexer). Four downlink wavelengths and four uplink wavelengths are separated by using a WDM filter 612. After being transmitted in a section of a fiber, the four downlink wavelengths are evenly divided into multiple paths (which are generally 4, 8, 16, 32, 64 paths, and the like) by using a POS optical splitter 614, and each path passes through each distribution fiber 616, and arrives at all ONUs 618. As can be seen, the four downlink wavelengths exist when arriving at each ONU 618. As shown in FIG. 6, it is assumed that the first two ONUs 618 receive the wavelength $\lambda_1$, the third ONU 618 and the fourth ONU 618 receive the wavelength $\lambda_2$, the fifth ONU 618 and the sixth ONU 618 receive $\lambda_3$, and the seventh ONU 618 and the eighth ONU 618 receive $\lambda_4$. According to FIG. 6, each ONU 618 returns all of the other three wavelengths. Therefore, the first two ONUs 618 reflect $\lambda_2$, $\lambda_3$, and $\lambda_4$, the third ONU 618 and the fourth ONU 618 receive the wavelengths $\lambda_1$, $\lambda_3$, and $\lambda_4$, the fifth ONU 618 and the sixth ONU 618 receive the wavelengths $\lambda_1$, $\lambda_2$, and $\lambda_4$, and the seventh ONU 618 and the eighth ONU 618 receive the wavelength $\lambda_1$, $\lambda_2$, and $\lambda_3$. It can be found by comparing these four groups of transmit wavelengths that reflected wavelengths necessarily include either of $\lambda_1$ and $\lambda_2$ (either of $\lambda_2$ and $\lambda_3$, either of $\lambda_3$ and $\lambda_4$, or either of $\lambda_1$ and $\lambda_4$). That is, any two wavelengths (for convenience of description, $\lambda_1$ and $\lambda_2$ are selected) are necessarily returned from all ONUs 618, pass through all distribution fibers 616, penetrate through the POS optical splitter 614, and eventually return to the OLT.

Specifically, processor 624 selects $\lambda_1$ and $\lambda_2$, and causes OTDR 626 to load low frequency detection information onto $\lambda_1$ and $\lambda_2$. The low frequency detection information is transmitted to the ONU 618 with original high frequency information data. However, the ONU 618 receiving optical waves of $\lambda_1$ and $\lambda_2$ extracts only the high frequency information, and discards the low frequency information. Therefore, a downlink signal may be normally received. For some ONUs 618 that do not receive $\lambda_1$ and $\lambda_2$, the ONUs 618 reflect all low frequency and high frequency signals back to the OLT. The reflected signal is the same as a downlink signal. Therefore, when arriving at the WDM filter 612, the reflected signal does not enter a receiver 608 on a right side, and only returns to a transmitter 602 on a left side. To normally receive the reflected signal, a branch 620 needs to be extra added at an egress of the transmitter 602, so as to enable a reflected optical signal to enter the receiver 608. In the receiver 608, only a low frequency detection signal is extracted by using an electrical filter, and the high frequency information data is filtered out. Fault detection is basically completed through the foregoing processes.

In the foregoing solutions, a problem that $\lambda_1$ and $\lambda_2$ simultaneously enter the transmit end of the OLT occurs. Consequently, signal interference occurs. Low frequency signals of $\lambda_1$ and $\lambda_2$ are alternately modulated in a time division multiplexing manner. That is, when there is a low frequency signal on $\lambda_1$, a low frequency signal on $\lambda_2$ is turned off; or when there is a low frequency signal on $\lambda_2$, a low frequency signal on $\lambda_1$ is turned off, so as to ensure that only one low frequency signal enters the receiver 608. Alternatively, low frequency signals of different frequencies are loaded onto $\lambda_1$ and $\lambda_2$ in a frequency division multiplexing manner. Therefore, even if two groups of low frequency signals are received, the two can still be distinguished by using an electrical filter.

Figure 7:
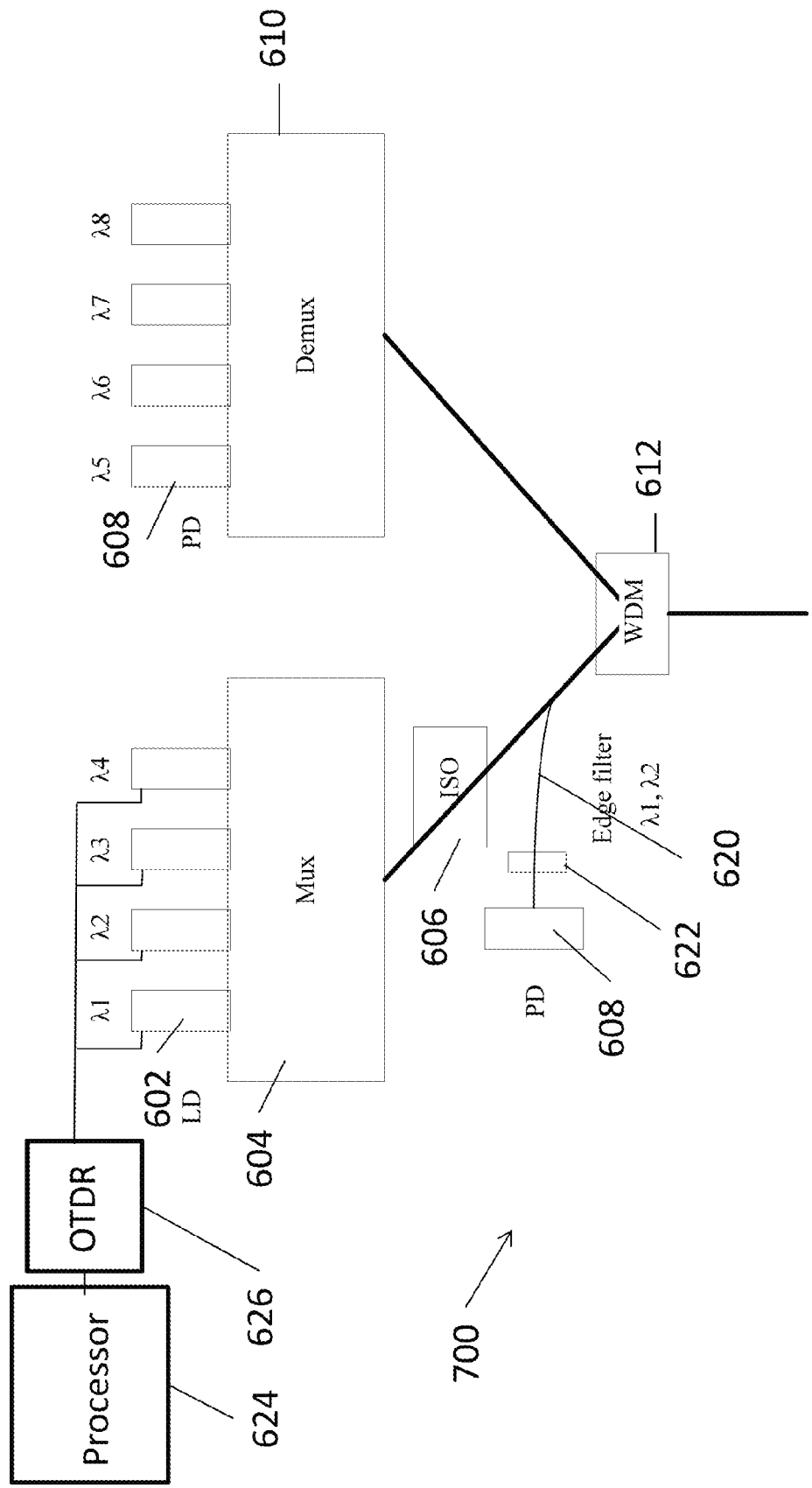
FIG. 7 is a schematic structural diagram of a function module of an OLT of a TWDM-PON with a filter according to an embodiment.

In addition, although the low frequency signals are loaded onto only $\lambda_1$ and $\lambda_2$, $\lambda_3$ and $\lambda_4$ also enter the receiver 608 at the transmit end of the OLT. The signal becomes noise and affects a detection effect of the low frequency signal. To further improve performance, an optical filter (in FIG. 7, only an electrical filter 622 is shown, and the optical filter is not shown) may be added before the receiver 608. The optical filter may filter out high frequencies $\lambda_3$ and $\lambda_4$, and receive $\lambda_1$ and $\lambda_2$.

In this embodiment of the present invention, low frequency detection signals are loaded onto at least two optical waves, and an electrical filter is disposed before a receiver 608, to obtain the detection signals, thereby performing OTDR detection in a TWDM-PON.

Embodiment 2

This embodiment further provides an OTDR implementation apparatus. The apparatus includes M transmitters, configured to transmit M optical waves of different wavelengths, where M is greater than or equal to 2. The apparatus also includes a processor, configured to: load a first downlink optical signal onto a second optical wave, and adjust a receive wavelength of a first optical network unit (ONU), to convert a first wavelength to a second wavelength, where the first ONU corresponds to a first optical wave. The apparatus also includes an OTDR detection circuit, configured to load an OTDR detection signal onto the first optical wave, where the OTDR detection signal is a low frequency signal. The apparatus also includes M+1 receivers, where a first receiver is connected to an egress link of the M transmitters, and is configured to receive a reflected signal of an optical wave carrying an OTDR detection signal, and the other M receivers are connected after a demultiplexer (Demux), and each are configured to receive multiple normal uplink signals.

Optionally, the adjusting a receive wavelength of a first optical network unit (ONU), to convert a first wavelength to a second wavelength specifically includes: delivering, by the processor, a control message to the first ONU, where the control message is used to the first ONU to adjust a wavelength of the first optical wave to a wavelength of the second optical wave.

The control message is sent by using a physical layer operation administration management (PLOAM) message.

A frame format of the control message may be set with reference to a frame format of a PLOAM message in the prior art, which is not described in detail herein again.

Optionally, the apparatus further includes an optical filter, connected before the first receiver, and configured to: obtain the reflected signal of the optical wave carrying the OTDR detection signal, transmit the reflected signal to the first receiver, and filter out reflected signals of other multiple optical waves.

Correspondingly, this embodiment further provides an OTDR implementation method. The method includes adjusting a downlink signal of an OLT, so that a first downlink signal is loaded onto a second optical wave. Loading an OTDR detection signal onto a first optical wave; and receiving a reflected optical signal of the optical wave onto which the OTDR signal is loaded.

Optionally, receiving a reflected optical signal of the optical wave onto which the OTDR signal is loaded includes: receiving the reflected optical signal by using a receiver connected before a transmitter, and filtering out other optical signals.

In this embodiment, there is only an OTDR signal on a wavelength of an OTDR, and there is no high frequency data signal. Therefore, on an OTDR receiver, optionally, an electrical filter may not be used.

An application scenario of this embodiment of the present invention is specifically described below with reference to FIG. 8 and FIG. 9.

Figure 8:
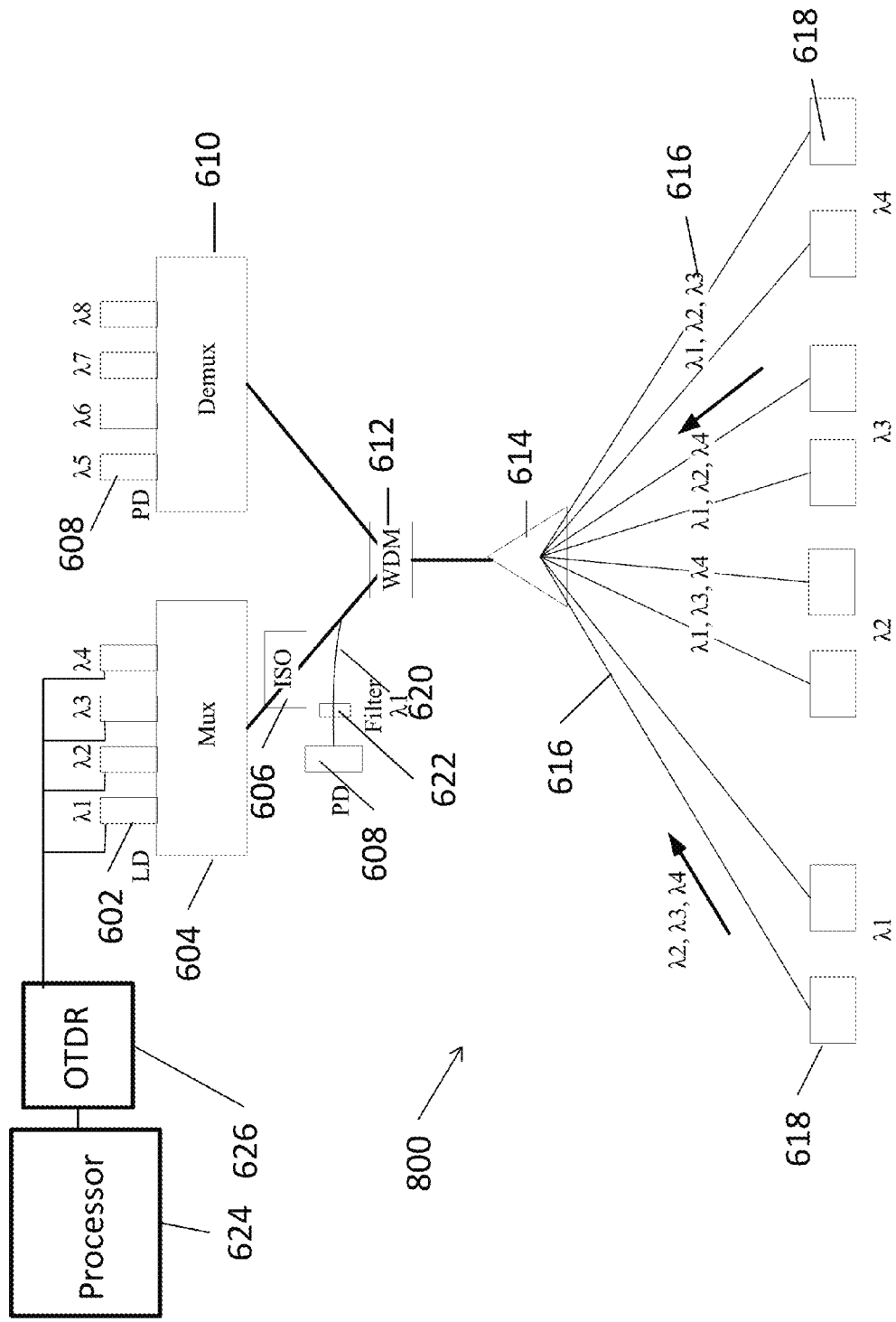
FIG. 8 is a schematic structural diagram of a TWDM-PON in a normal working state according to an embodiment.

FIG. 8 shows a TWDM-PON 800 in a normal working state. Each transmit wavelength in the working state is shown on a right side, and only a high frequency signal is transmitted and no low frequency detection signal is transmitted.

Figure 9:
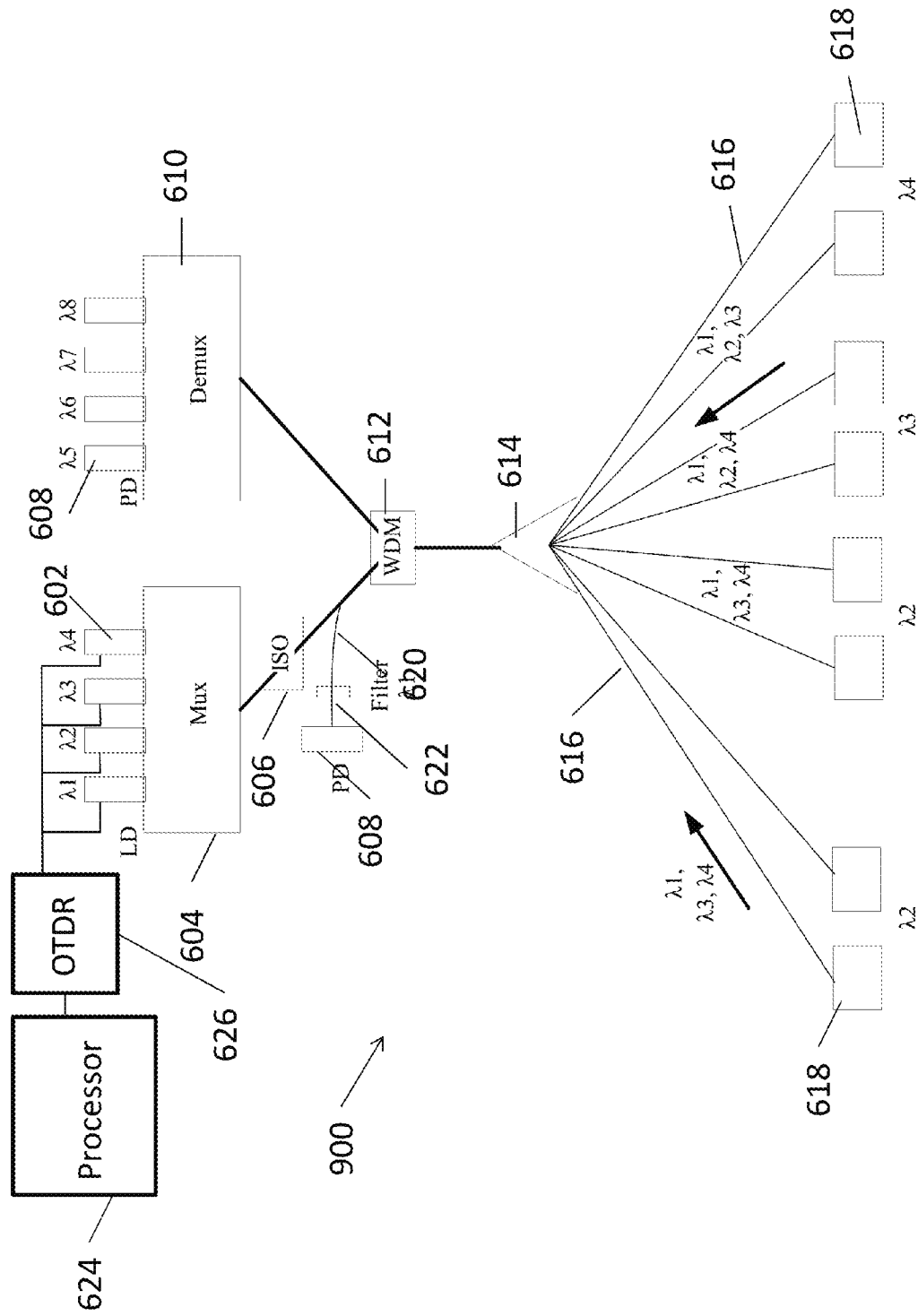
FIG. 9 is a schematic structural diagram of a TWDM-PON in an OTDR state according to an embodiment.

As shown in FIG. 9, when a system is in an OTDR state, adjustment may be selectively performed on wavelengths of one group of ONUs 618, so that all downlink data signals of an entire network are downloaded by using other three wavelengths. The OLT instructs one group of ONUs 618 to adjust the wavelengths, which may be implemented by delivering a control message, where the control message may be sent by using a PLOAM message. For a message format, reference may be made to a frame format about the PLOAM message that is set in the standard G984.3, which is not described in detail herein again. In addition, downloading original four signals by using three wavelengths is the prior art, which is not described in detail herein again. For convenience of description, it is assumed that all ONUs 618 originally receiving $\lambda_1$ are adjusted to receive $\lambda_2$. Therefore, all the ONUs 618 reflect $\lambda_1$. Therefore, only a low frequency signal needs to be loaded onto $\lambda_1$, and all downlink signals of the OLT are downloaded by using optical waves of $\lambda_2$, $\lambda_3$, and $\lambda_4$. A difference from Embodiment 1 is that for signals entering the receiver at the transmit end of the OLT, only a low frequency signal on $\lambda_1$ exists, and can be completely extracted by using a simple electrical filter. Subsequently, fault information of a network can be obtained in a conventional OTDR signal processing manner.

Optionally, the OLT performs, by using a MAC control protocol, wavelength adjustment for all ONUs, which receive the optical wave of the wavelength $\lambda_1$ onto which the OTDR signal is loaded, in the system, so that the OLT is configured to receive one of other M−1 signals, for example, a tunable filter of the ONU 618 is adjusted, so that the tunable filter receives the optical wave whose wavelength is $\lambda_2$. In this case, filters in all ONU 618 devices all have strong reflection for the wavelength onto which the OTDR signal is loaded. Therefore, fault information of a branch link at which all ONUs 618 are located can be reflected on the wavelength.

Optionally, a receiver 608, which is connected to the transmitter 602, in an OLT device receives reflected light of the optical wave carrying the OTDR detection signal.

The foregoing technical solutions are applied to a TWDM-PON, so that when a TWDM-PON has a fault, a transmitted optical signal is received by using an OTDR, thereby obtaining information about a fault of an entire ODN.

Embodiment 3

This embodiment further provides an OTDR implementation apparatus, including: M transmitters, configured to transmit M optical waves of different wavelengths, where M is greater than or equal to 2. The apparatus also includes a processor, configured to control an OTDR detection circuit to load an OTDR detection signal onto a first transmitter, where the first transmitter is configured to only load the OTDR detection signal, and the other M−1 transmitters are configured to transmit a downlink optical signal, where the downlink optical signal is a high frequency signal. The apparatus also includes the OTDR detection circuit, configured to generate the OTDR detection signal, where the OTDR detection signal is a low frequency signal. The apparatus also includes M receivers, where a first receiver is connected to an egress link of the M transmitters, and the other M−1 receivers are connected after a demultiplexer, and are configured to receive multiple uplink signals, where a filter is connected before the first receiver, where a wavelength of the filter is the same as a wavelength of the first receiver, so that only a reflected signal of an optical signal transmitted by the first transmitter can enter the first receiver.

Figure 10:
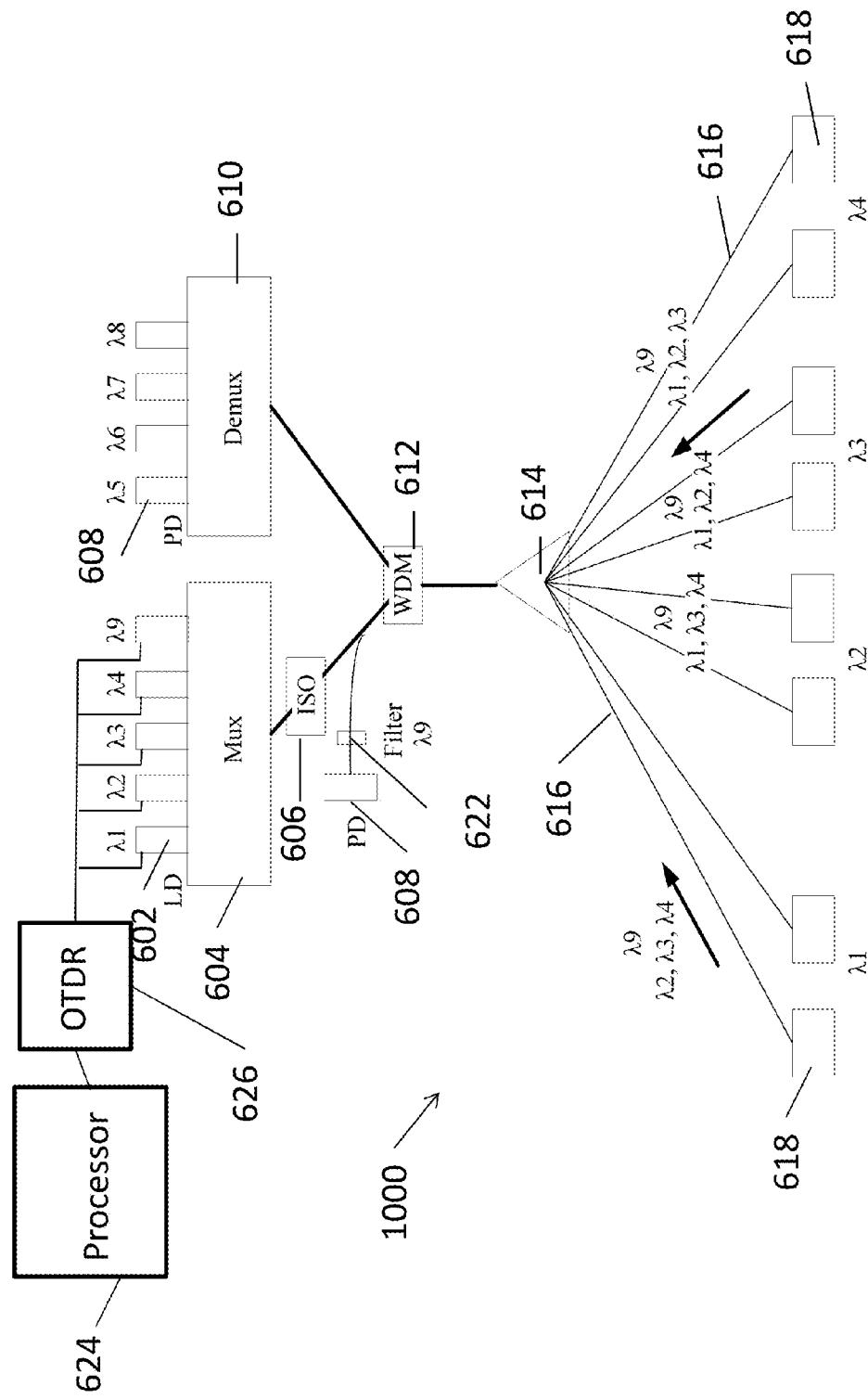
FIG. 10 is a schematic structural diagram of a TWDM-PON to which an extra detection wavelength is added according to an embodiment.

A TWDM-PON is a multi-wavelength system. Therefore, an optical path dedicatedly used for detection is extra added. A downlink optical signal is no longer loaded onto the optical path, which does not obviously affect complexity of the system. As shown in FIG. 10, at a transmit end of an OLT, a transmitter 602 may be added. A wavelength $\lambda_9$ is transmitted, and the wavelength is dedicatedly used for OTDR detection. Another optical path is completely used for normal data transmission. Only the newly added wavelength $\lambda_9$ is made to load a fault detection signal. In this case, all ONUs 618 reflect $\lambda_9$. Correspondingly, a filter is added at a front end of the transmitter of the OLT, so as to ensure that only $\lambda_9$ enters the receiver 608, thereby reducing noise and improving a detection effect.

The foregoing technical solutions are applied to a TWDM-PON, so that when a TWDM-PON has a fault, a transmitted optical signal is received by using an OTDR, thereby obtaining information about a fault of an entire ODN.

Embodiment 4

Embodiments provide a passive optical network system, including an optical line terminal (OLT) and an optical network unit (ONU), where the OLT is connected to the ONU by using an optical distribution network (ODN), the OLT includes an optical module, and the OTDR implementation apparatus in Embodiment 1, Embodiment 2, or Embodiment 3 is built in the optical module.

Embodiment 5

Embodiments provide a passive optical network system, including: an optical line terminal (OLT), an OTDR implementation apparatus, and an optical network unit (ONU), where the OLT is connected to the ONU by using an ODN, the OTDR implementation apparatus is connected to the ODN by using an optical splitter, and the OTDR implementation apparatus is the OTDR implementation apparatus in Embodiment 1, Embodiment 2, or Embodiment 3.

The foregoing technical solutions are applied to a TWDM-PON, so that when a TWDM-PON has a fault, a transmitted optical signal can be received by using an OTDR, thereby obtaining information about a fault of an entire ODN.

The foregoing descriptions are merely specific implementation manners of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. An optical time domain reflectometer (OTDR) implementation apparatus, comprising:
    a plurality of transmitters, configured to transmit a plurality of optical waves of different wavelengths;
    a multiplexer, connected to each of the plurality of transmitters;
    a wavelength filter, connected to the multiplexer;
    an OTDR detection circuit, configured to generate an OTDR detection signal, wherein the OTDR detection circuit is coupled to the plurality of transmitters;
    a processor, coupled to the OTDR detection circuit, wherein the processor is configured to select at least two random optical waves transmitted by the plurality of transmitters onto which to load OTDR detection signals generated by the OTDR detection circuit, and to cause the OTDR detection circuit to load the OTDR detection signals onto the selected at least two random optical waves by the plurality of transmitters, wherein the OTDR detection signal is a low frequency signal, and wherein the at least two random optical waves carry a high frequency data signal; and
    a plurality of receivers;
    a demultiplexer, wherein the demultiplexer is connected to the wavelength filter;
    wherein a first receiver of the plurality of receivers is connected to an egress link, the egress link being connected between the multiplexer and the wavelength filter, wherein the first receiver is configured to receive low frequency signals, including the reflected signals of the at least two optical waves carrying the OTDR detection signals, and to transmit the reflected signals to the OTDR detection circuit for detection;
    wherein other receivers of the plurality of receivers are connected to the demultiplexer, and each receiver of the other receivers is configured to receive multiple uplink signals.

2. The apparatus according to claim 1, wherein the processor being configured to cause the OTDR detection circuit to load the OTDR detection signals onto the selected at least two random optical waves by the plurality of transmitters comprises the processor being configured to:
cause the OTDR detection circuit to load an OTDR detection signal of a first frequency onto a first optical wave of the at least two random optical waves by the plurality of transmitters; and
cause the OTDR detection circuit to load an OTDR detection signal of a second frequency onto a second optical wave of the at least two random optical waves by the plurality of transmitters.

3. The apparatus according to claim 2, wherein the apparatus further comprises an optical filter, wherein one end of the optical filter is connected to the first receiver, and the optical filter is configured to:
receive the reflected signals of the at least two random optical waves;
transmit the reflected signals to the first receiver; and filter out other signals.

4. The apparatus according to claim 2, wherein the apparatus further comprises an electrical filter, wherein one end of the electrical filter is connected to the first receiver, and the electrical filter is configured to transmit a reflected signal of the first optical wave carrying the OTDR detection signal of the first frequency and a reflected signal of the second optical wave carrying the OTDR detection signal of the second frequency in different paths.

5. The apparatus according to claim 1, wherein the processor being configured to cause the OTDR detection circuit to load the OTDR detection signals onto the selected at least two random optical waves comprises the processor being configured to:
cause the OTDR detection circuit to load an OTDR detection signal onto a first optical wave of the at least two random optical waves by the plurality of transmitters at a first time; and
cause the OTDR detection circuit to load an OTDR detection signal onto a second optical wave of the at least two random optical waves by the plurality of transmitters at a second time.

6. The apparatus according to claim 5, further comprising an optical filter, wherein one end of the optical filter is connected to the first receiver, and the optical filter is configured to:
receive the reflected signals of the at least two random optical waves;
transmit the reflected signals to the first receiver; and filter out other signals.

7. An optical time domain reflectometer (OTDR) implementation apparatus, comprising:
M transmitters, configured to transmit M optical waves of different wavelengths, wherein M is greater than or equal to 2;
a multiplexer, connected to each of the M transmitters;
a wavelength filter, connected to the multiplexer;
a demultiplexer, wherein the demultiplexer is connected to the wavelength filter;
a processor, configured to:
cause the M transmitters to load a first downlink optical signal onto a second optical wave;
adjust a receive wavelength of a first optical network unit (ONU); and
convert a first wavelength to a second wavelength, wherein the first ONU corresponds to a first optical wave;

an OTDR detection circuit, coupled to the processor and to the M transmitters, and configured to generate an OTDR detection signal, and to cause the OTDR detection signal to be loaded onto the first optical wave, wherein the OTDR detection signal is a low frequency signal; and
M+1 receivers, wherein a first receiver is connected to an egress link of the M transmitters, the egress link is connected between the multiplexer and the wavelength filter, and the first receiver is configured to receive a reflected signal of an optical wave carrying an OTDR detection signal, and the other M receivers are connected to the demultiplexer, and each are configured to receive multiple uplink signals.

8. The apparatus according to claim 7, wherein adjusting the receive wavelength of a first optical network unit (ONU) to convert a first wavelength to a second wavelength comprises:
delivering a control message to the first ONU, wherein the control message instructs the first ONU to adjust a wavelength of the first optical wave to a wavelength of the second optical wave.

9. The apparatus according to claim 8, wherein the control message is sent using a physical layer operation administration management message.

10. The apparatus according to claim 7, wherein the apparatus further comprises an optical filter, connected before the first receiver, and configured to:
obtain the reflected signal of the optical wave carrying the OTDR detection signal;
transmit the reflected signal to the first receiver; and and filter out other signals.

11. An optical time domain reflectometer (OTDR) implementation apparatus, comprising:
M transmitters, configured to transmit M optical waves of different wavelengths, wherein M is greater than or equal to 2;
a multiplexer, connected to each of the M transmitters;
a wavelength filter, connected to the multiplexer;
a demultiplexer, connected to the wavelength filter;
a processor, configured to control an OTDR detection circuit to load an OTDR detection signal onto a first transmitter, wherein the first transmitter is configured to only load the OTDR detection signal, and the other M−1 transmitters are configured to transmit a downlink optical signal, wherein the downlink optical signal is a high frequency signal;
the OTDR detection circuit, configured to generate the OTDR detection signal, wherein the OTDR detection signal is a low frequency signal; and
M receivers, wherein a first receiver is connected to an egress link of the M transmitters, the egress link is connected between the multiplexer and the wavelength filter, and the other M−1 receivers are connected to the demultiplexer, and are configured to receive multiple uplink signals.

12. The apparatus according to claim 11, further comprising:
a filter, connected before the first receiver, wherein a wavelength of the filter is the same as a wavelength of the first receiver, so that only a reflected signal of an optical signal transmitted by the first transmitter can enter the first receiver.

* * * * *